United States Patent [19]
Sjödin et al.

[11] Patent Number: 5,995,843
[45] Date of Patent: Nov. 30, 1999

[54] METHOD AND ARRANGEMENT FOR USING A MOBILE PHONE IN A WIRELESS OFFICE NETWORK

[75] Inventors: Staffan A. Sjödin, Tyresö ; Dick Y. Eriksson, Haninge, both of Sweden

[73] Assignee: Telefonaktiebolaget LM Ericsson, Stockholm, Sweden

[21] Appl. No.: 08/769,058

[22] Filed: Dec. 18, 1996

[51] Int. Cl.⁶ ...................................................... H04Q 7/20
[52] U.S. Cl. .................... 455/462; 455/426; 455/555; 455/445
[58] Field of Search .................................. 455/422, 426, 455/432, 435, 445, 462, 463, 465, 554, 555, 414

[56] References Cited

U.S. PATENT DOCUMENTS

| | | | |
|---|---|---|---|
| 4,748,655 | 5/1988 | Thrower et al. | 455/555 |
| 4,843,622 | 6/1989 | Yotsutani et al. | 455/555 |
| 4,879,740 | 11/1989 | Nagashima et al. | 455/462 |
| 5,090,051 | 2/1992 | Muppidi et al. | 455/462 |
| 5,218,628 | 6/1993 | Ito | 455/462 |
| 5,442,684 | 8/1995 | Hashimoto et al. | 455/555 |
| 5,454,032 | 9/1995 | Pinard et al. | |
| 5,577,101 | 11/1996 | Bohm | 455/462 |
| 5,594,777 | 1/1997 | Makkonen et al. | 455/462 |
| 5,598,458 | 1/1997 | Bales et al. | 455/414 |

FOREIGN PATENT DOCUMENTS

| | | |
|---|---|---|
| 0639034 | 2/1995 | European Pat. Off. . |
| 0740482 | 10/1996 | European Pat. Off. . |
| 2225512 | 5/1990 | United Kingdom . |
| WO 9405129 | 3/1994 | WIPO . |
| WO 9426073 | 11/1994 | WIPO . |
| WO 9621329 | 7/1996 | WIPO . |

OTHER PUBLICATIONS

Reference is also made to related application U.S. application Ser. No. 08/366,471 filed on Dec. 30, 1994 and abandoned on Jan. 21, 1997 in favor of 37 C.F.R. 1.62 U.S. File Wrapper Continuation application Ser. No. 08/786,522 filed on Jan. 21, 1997. (Not provided herein, on file with the U.S. Patent and Trademark Office).

*Primary Examiner*—Dwayne D. Bost
*Assistant Examiner*—Nay A. Maung
*Attorney, Agent, or Firm*—Burns, Doane, Swecker & Mathis, L.L.P.

[57] ABSTRACT

The present invention relates to a method and an apparatus for using a mobile phone in a Wireless Office Network. The apparatus includes a Service Engine 40 connected between a MSC 30 and a PBX 50. The Service Engine 40 includes a Subscriber Data Base 43 in which mobile telephone extensions and corresponding wireless Office System extension number (WOSno) are registered. When the service engine receives a call to a WOS user the service engine converts the WOS number to the corresponding mobile subscriber number. The WOS number of a calling part is being presented on the terminal of the called part.

8 Claims, 4 Drawing Sheets

METHOD AND ARRANGEMENT FOR USING A MOBILE PHONE IN A WIRELESS OFFICE NETWORK

TECHNICAL FIELD OF THE INVENTION

The present invention relates to a method and an apparatus in a telecommunication system More specifically the invention relates to an arrangement and a method for using a mobile phone in a Wireless Office Network.

DESCRIPTION OF RELATED ART

There is a related system described in the U.S. patent application with filing U.S. Ser. No. 08/366,471 and with the title "Cellular phone access to PBX". In the mentioned application is described a system for providing a mobile cellular phone with access to a Private Branch Exchange and particularly to the services provided by the exchange.

SUMMARY OF THE INVENTION

According to the invention there is a different way of solving the problem of making it possible to use a mobile phone within a Private Network.

A first object of the invention is to allow subscribers to use their standard mobile phones within the coverage area of a Wireless Office Network.

A second object of the invention is to obtain a Wireless Office Network in which no changes need to be done in the mobile telephone, in the Mobile Switching Centre or in the PBX.

A third object of the invention is to make concurrent ringing of the subscriber's desk phone and the mobile phone to avoid long ring delays for callers.

A fourth object of the invention is to present a calling Wireless Office System extension number on the called terminal.

The invention is related to a service engine implemented in a Wireless Office Network including a base station, a Mobile Switching Centre, said Service Engine and a Private Branch Exchange. The Mobile Switching Centre (MSC) being connected to a Cellular Network and the Private Branch Exchange (PBX) being connected to a Public Switched Telephone Network (PSTN) or a Private Telephone Network (PTN). Wireless Office System (WOS) users have their Mobile Telephones registered in the Service Engine (SE).

The invention also includes a method for making a call from a registered mobile telephone within the coverage area of the WOS network and a method for receiving an incoming call in a first Mobile Telephone which is registered in the Service Engine as a Wireless Office user.

One advantage of the invention is that a mobile phone can be used within an office building. Mobile telephone originations from within the WOS network coverage area is being routed via the normal land-line telephone facilities of the premises systems (PBX), such as exploiting bulk pricing and least cost routing. Thus, costs for using the mobile phone is being reduced by use of the invention Another advantage is that calls to a mobile phone of a wireless office user can be received also outside the coverage area of the Wireless Office Network.

A further advantage is that in the system according to the invention there are no extra requirements on the mobile telephone, the mobile network or the PBX.

A further advantage is that guests in the Wireless Office Network can use their Mobile Phones without being registered in the system

BRIEF DESCRIPTION OF THE DRAWINGS

A more complete understanding of the method and system of the present invention may be had by reference to the detailed description following, taken in conjunction with the accompanying drawings, wherein.

DESCRIPTION OF PREFERRED EMBODIMENT

Figure 1:
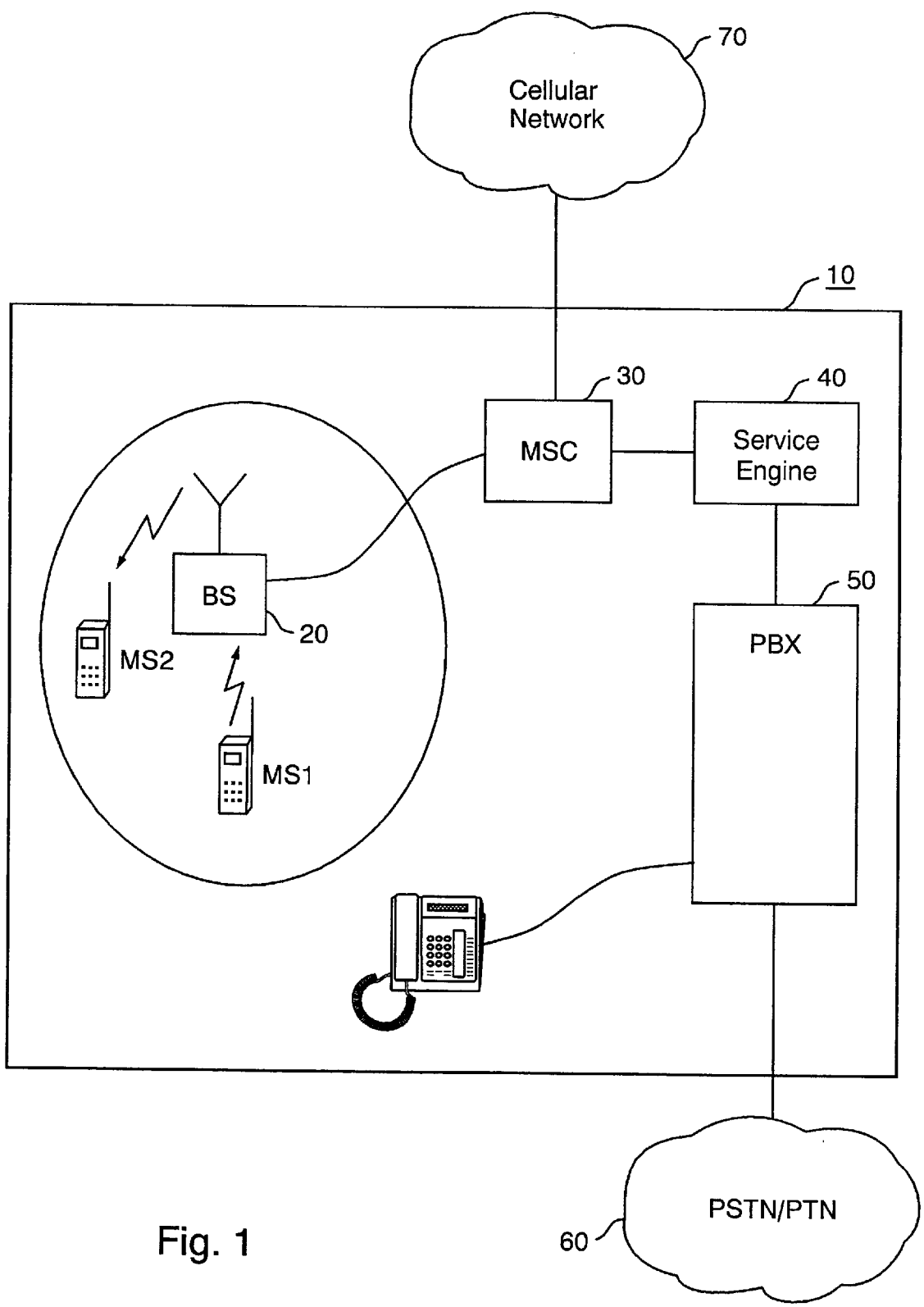
FIG. 1 is a block diagram of a Wireless Office System connected to a Cellular Network and a Public Switched Telephone Network and/or a Private Telecommunication Network.

FIG. 1 discloses a Wireless Office Network 10 which includes a Base Station 20 (BS) with a specific radio coverage area, a Mobile Switching Centre 30 (MSC), a Service Engine 40 (SE) and a Private Branch Exchange 50 (PBX). In the example there are two mobile stations MS1 and MS2 in the radio coverage area of the base station 20. The Base Station 20 is connected to the Mobile Switching Centre 30 (MSC), which is a regular MSC that provides switching functions and cellular mobility management functions such as location registration, authentication and handover. In this implementation the MSC sometimes is denoted OSC Office Switching Centre. The MSC 30 is connected to the Service Engine 40 which in turn is connected to the PRX 50. The MSG is connected to a Cellular Network 70 and the PBX is connected to a Public Switched Telephone Network or a Private Telecommunication Network (PSTN/PTN) 60.

Figure 2:
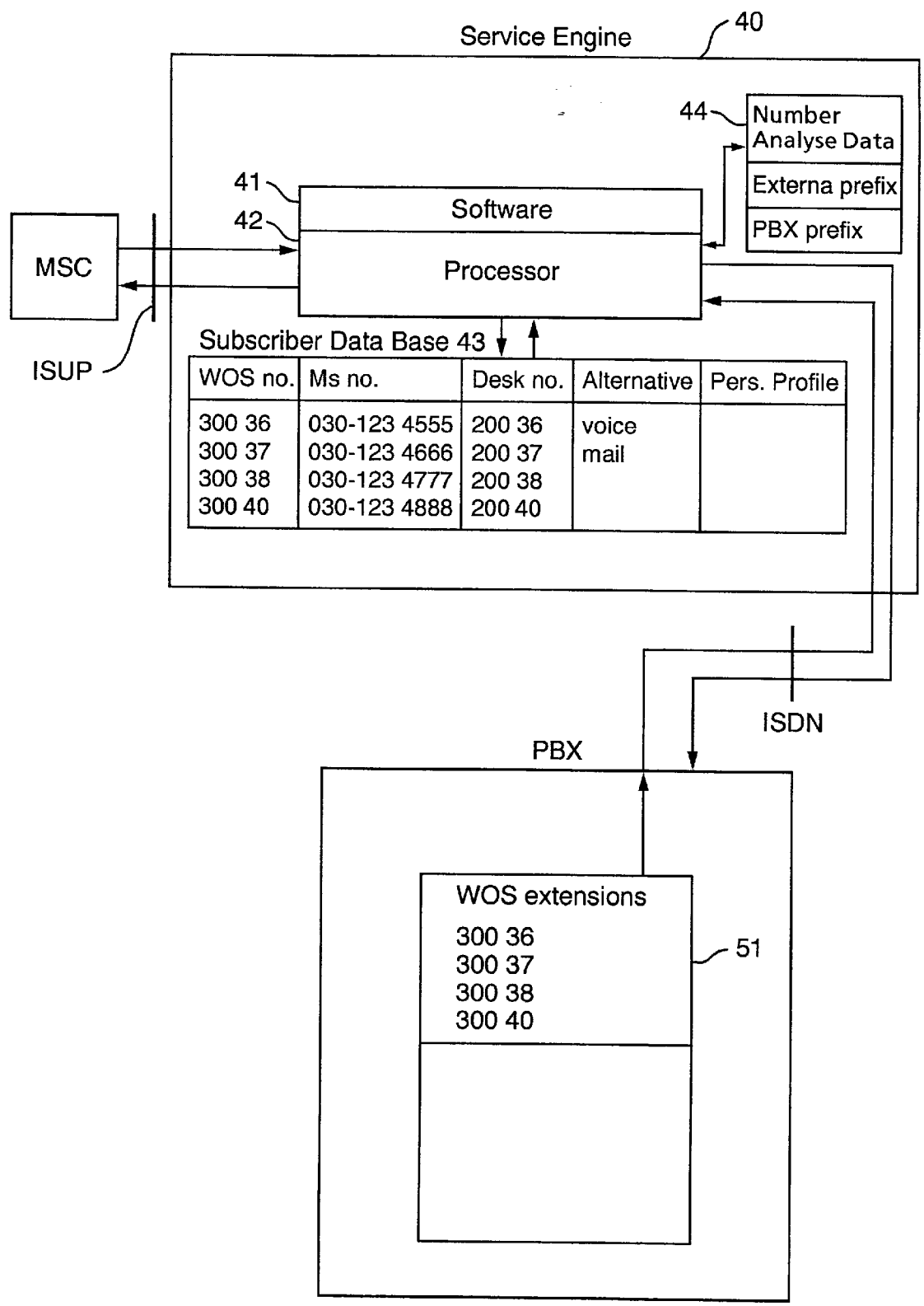
FIG. 2 illustrates a Service Engine according to the invention, the Service Engine being part of the Wireless Office System.

FIG. 2 shows a more detailed figure of the Service Engine 40 which is connected to the MSC by SS7 ISUP (ISDN User Part) trunks and to the PBX by ISDN (integrated Switched Digital Network) trunks. The Service Engine is a gateway between the PBX and the MSC and thus converts ISDN (integrated Switched Digital Network) signalling on the PBX side to SS7 ISUP signalling on the MSC side and vice versa. It is thus clear that the Service Engine switches calls between the PBX and the MSC. The Service Engine 40 is controlled and administered independently of the PBX 50. The introduction of the Service Engine thus eliminates potential translation, control, resource and sizing problems of the PBX The Service Engine 40 includes software 41 and a processor 42 for controlling of the Service Engine 40. The Service Engine also includes a Subscriber Data Base 43 in which all Wireless Office System users are being registered. The processor 42 is connected with the Subscriber Data Base 43. The processor 42 also has access to stored Number Analyse Data 44 which includes information on a first prefix for external calls and a second prefix for PBX calls.

The Subscriber Data Base 43 of the Service Engine 40 keeps track of registered mobile subscriber numbers (MSno.) and corresponding Wireless Office System extension numbers (WOSno.). Each Mobile phone has a specific Wireless Office System extension number (WOSno.). The Subscriber Data Base 43 also includes information on corresponding desk phones connected to the PBX. the desk phones have their desk phone numbers (Deskno.) registered in the Subscriber Data Base. Thus, the desk phone will have an extension number different from the WOS extension number. In the Subscriber Data Base 43 there are also listed alternative extensions (alternative) to which calls are routed when the mobile phone is not accessible. The alternative extension can for instance be a voice mail number. There is also a Personal Profile stored in the Subscriber Data Base 43. For instance, the personal profile can be used for storing any information on rerouting if no answer from the mobile phone. The personal profile can also be programmed to not reroute calls to the mobile phone during specified times.

In the PBX the WOS extension numbers (WOS no.) are a part of the private numbering plan 51 Thus, the Wos numbers can be seen as an extension of the PBX. When a call to a WOS extension is received in the PBX, the PBX just sends the call to the Service Engine. The mobile phones, however, are not PBX phones and the Wireless Office System is not a "classic" wireless system with all the features of such a system. The mobile phones which are registered in the Subscriber Data Base 43 does not have access to all the services in the PBX.

Figure 3:
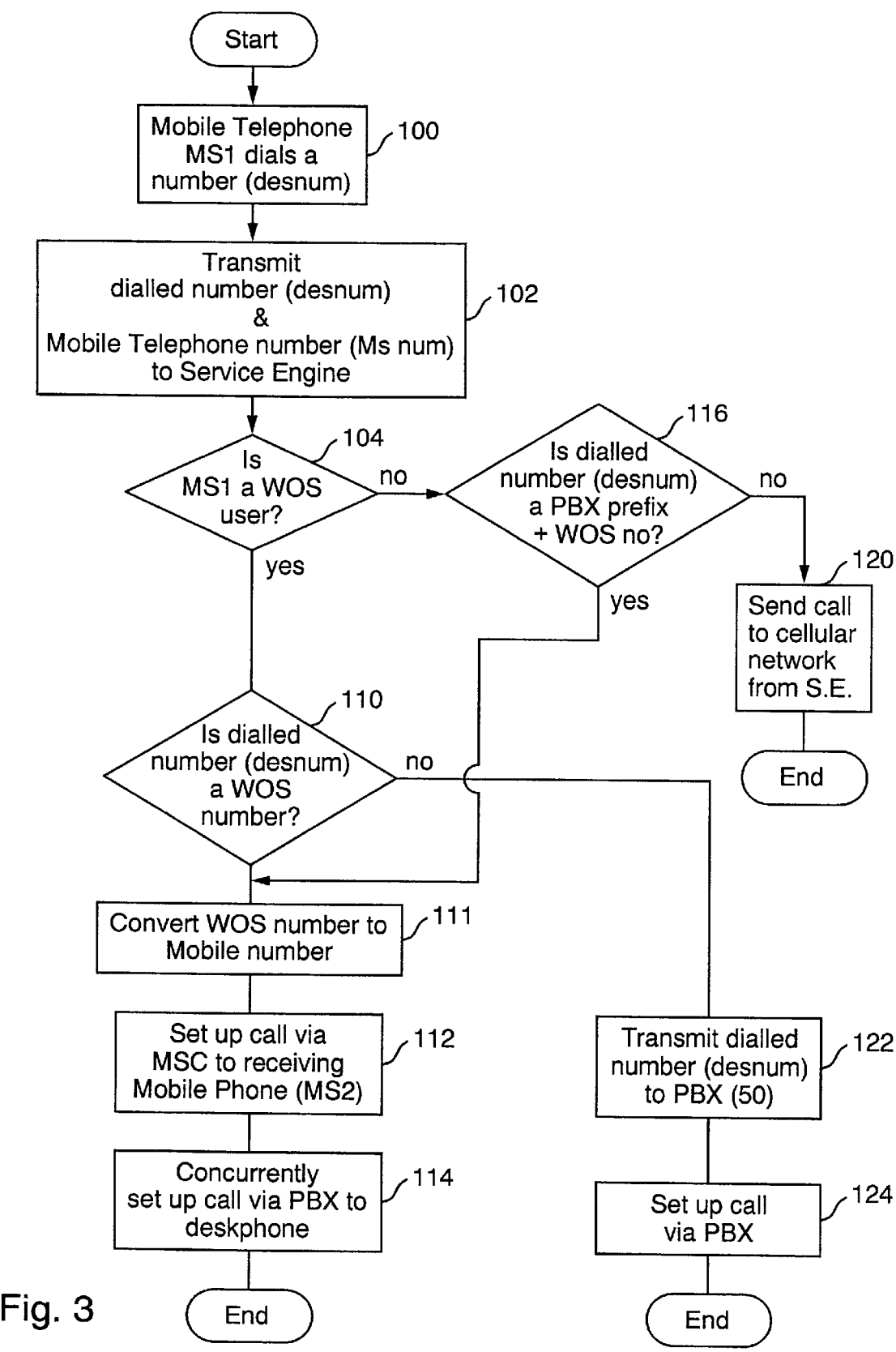
FIG. 3 is a flow chart describing how the Wireless Office System is handling an outgoing call from a Mobile Telephone within the coverage area of the Wireless Office System.

FIG. 3 is a flow chart illustrating the different method steps that are taken in a preferred embodiment of the invention. See also FIG. 1 and 2 during description of the method steps. This description is related to a method for making a call from a first mobile telephone MS1 in the described Wireless Office Network 10. The mobile telephone has to be in the coverage area of the base station 20. The first mobile telephone has in this example the mobile telephone number 030-1234555 and is registered in the Subscriber Data Base with WOS number 30036 and desk phone number 20036 Suppose, In this example, that the user of the first mobile telephone wants to make a phone call to a second mobile telephone MS2, which also is a registered WOS user with WOS number 30040 and mobile telephone number 030-1234888. In a first step 100 the desired number (desnum=30040) is dialled from the first mobile telephone MS1. In step 102 the base station transmitts information on dialled number (desnum) and mobile telephone number on the dialling part to the MSC 30. The MSC sends all information from the connected base station 20 to the Service Engine 40. In step 104 the processor 42, under control of a the software 41, analyses if the dialling mobile phone is a registered WOS user. This is done by comparing the mobile phone number of the dialling mobile phone MS1 with the listed mobile phone numbers in the Subscriber Data Base 43.

If the calling part is a registered WOS user, then in step 110 it is analysed if the dialled number is a WOS number (WOSno.) in the Subscriber Data Base 43. If dialled number is a WOS number, as in this example, then in step 111 the processor 42 under control of the program 41 converts the WOS number to the corresponding mobile telephone number. Then in step 112, a call is set up in a regular way via the MSC to the called mobile phone. In this example the conversion is being done from the dialled WOS number 30040 to mobile telephone number 030-1234888. The second mobile phone MS2 is in the coverage area of the WOS network and the MSC sets up the call to MS2. Concurrently in step 114, when the mobile phone is ringing the Service Engine sets up a call to the corresponding desk phone (20040) so that the receiver of the call can use the desk phone if it is preferred. The set up to the desk phone Is of course done only if there is a desk phone. When a call is set up, as described in step 112, the connection is being managed by the Service Engine 40. In step 112 and 114, when the number of the calling part is transmitted to the called part, the WOS number is always presented on the called terminal. For the purpose of presenting the WOS number the processor in the Service Engine (40), under the control of the program, converts the mobile telephone number to the WOS number for presentation of the WOS number on the called terminal.

In step 112 when the call is being set up to the second mobile phone it doesn't matter if the dialled mobile phone MS2 is within the coverage area of the Wireless Office Network or in the Cellular Network The MSC connects the call to the called mobile phone irrespective of where the phone is If the analyse in step 104 gives the result that the calling part is not a registered mobile phone there are some other features of the system. The calling part can be a guest who wants to use his mobile phone within the Wireless Office Network. The guest is not registered in Subscriber Data Base 43 It is, according to the invention, possible for a guest to use the Wireless Office System when calling a WOS extension number. This means that the guest dials the same number to a WOS user as from outside the Wireless Office Network. In step 116 an analyse is done to see if the dialled number has a PBX prefix and is a WOS number. This is done by a simple analyses in Number Analyse Data 44, of the first digits of dialled number. If the dialled number has the PBX prefix and is a WOS number, then the calls are handled by the Service Engine 40 as described in step 111, 112 and 114. Otherwise, in step 120, the call is returned from the Service Engine 40 to the Cellular Network 70. In the Cellular Network the call is being handled in a regular way.

If the analyse in step 110 makes clear that the dialled number is not a WOS number then, in step 122, the call is transmitted to the PBX 50. The call is then, in step 124 handled by the PBX in a regular way.

There is a further function in the system The function can be used if it is clear, after step 104, that the calling part is a WOS user If the calling part dials the mobile subscriber extension number (MSno.) to a WOS user and an external prefix is used then the call is being sent back to the MSC by the Service Engine. The service engine analyses the prefix, which has to be an external prefix, which is registered in the Number Analyse Data 44 in the Service engine. The Service Engine handles the call as a transit call. This is implemented by the processor 42, under control of the software 41. The purpose is to route the call directly to the cellular system instead of routing the call to the cellular system via the PBX and the Public Network.

Figure 4:
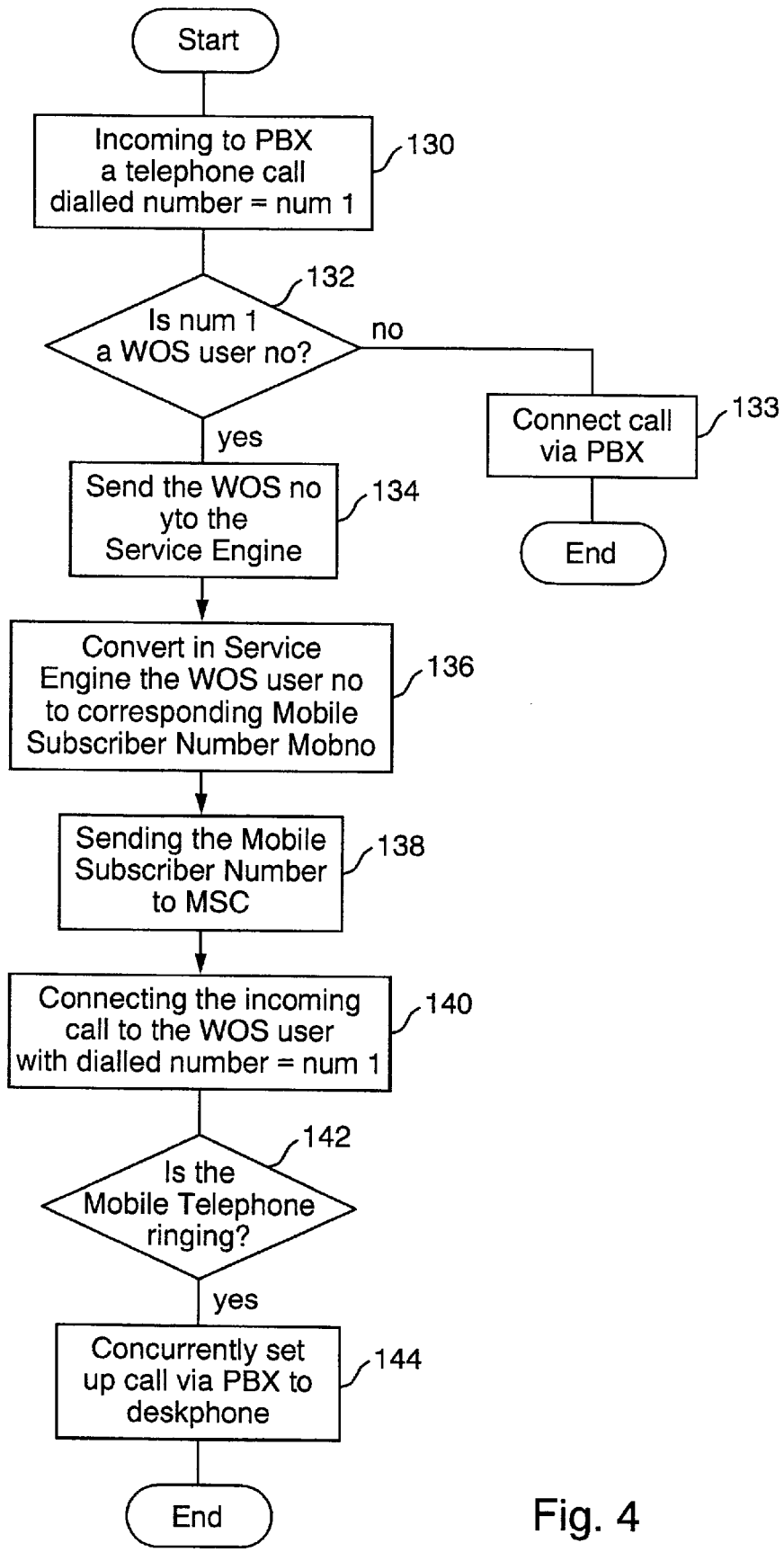
FIG. 4 is a flow chart describing how the Wireless Office System is handling an incoming call to a Wireless Office user.

The Service Engine also makes it possible to connect a call to the mobile phone of a WOS user. In FIG. 4 is described a method when a WOS user is receiving a call, which is coming to the PBX. In step 130 a call is coming into the PBX from the PSTN or from the PTN. The call can also be from an extension in the PBX as well. The dialled number is the WOS number 30040 to the second mobile phone MS2. In step 132 the incoming number is analysed and if the number is a WOS extension the dialled number is being sent to the Service Engine, which is described in step 134. Otherwise the call is connected in the PBX in a regular way, which is described in step 133.

The WOS number sent to the Service Engine is in step 136 converted to the corresponding mobile telephone number. In step 138 the converted mobile telephone number is being sent to the MSC. In step 140 the MSG is connecting the call to the called mobile telephone. When the called Mobile telephone is ringing in step 142, concurrently the corresponding deskphone is connected in step 144. In order to obtain concurrent ringing the Service Engine waits until the Mobile Telephone is ringing and when the mobile phone starts to ring the a call is also being set up to the corresponding desk phone. Setting up a call to a desk phone is often quicker process than setting up a call to a mobile phone. Therefore the difference in time between start of ringing signals on the mobile phone and on the desk phone is not noticable What is described in step 136, 138, 140, 142 and 144 is done in a way similar to what is described in connection with FIG. 3.

What is claimed is:

1. A method for making a call in a Wireless Office Network that includes a Mobile Switching Center (MSC), a Service Engine, and a Private Branch Exchange (PBX) connected to one or more wired terminals and one or more mobile telephones registered as Wireless Office System (WOS) subscribers identified by corresponding WOS numbers, the method comprising steps of:

receiving a dialed telephone number;

determining at the Service Engine whether the dialed telephone number corresponds to a registered WOS number for a called subscriber; and if the dialed telephone number is a registered WOS number, calling a mobile telephone having a corresponding mobile telephone number derived from the registered WOS number via the MSC, and calling a wired terminal assigned to the called subscriber via the PBX substantially simultaneous with calling the corresponding mobile station;

if the dialed telephone number is received from another mobile telephone having an associated mobile telephone, determining whether the associated telephone number is a registered WOS number; and if both the associated telephone number and the dialed number are not registered WOS numbers, handling the call by a cellular network via the MSC, instead of the WOS.

2. The method for making a call in a Wireless Office Network according to claim 1 further including the step of calling the wired terminal assigned to the called subscriber via the PBX, if the dialed telephone number is not a registered WOS number.

3. The method for making a call in a Wireless Office Network according to claim 1 further including the steps of:

determining whether the dialed telephone number is received from the PBX;

if so, determining whether the dialed number is a registered WOS number; and handling the call by the PBX, if the dialed number is not registered WOS numbers.

4. The method for making a call in a Wireless Office Network according to claim 1 further including the step of converting the registered WOS number to the corresponding mobile telephone number before calling the mobile telephone having the corresponding mobile telephone number.

5. A Wireless Office Network, comprising:

means for receiving a dialed telephone number;

a Private Branch Exchange (PBX) connected to one or more wired terminals and one or more mobile telephones registered as Wireless Office System (WOS) subscribers identified by corresponding WOS numbers;

a Mobile Switching Center (MSC);

a Service Engine that determines whether the dialed telephone number corresponds to a registered WOS number for a called subscriber, wherein if the dialed telephone number is a registered WOS number, the Service Engine sets up a call to a mobile telephone having a corresponding mobile telephone number derived from the registered WOS number via the MSC, and wherein the Service Engine sets up a call to a wired terminal assigned to the called subscriber via the PBX substantially simultaneous with calling the corresponding mobile station, and wherein if the dialed telephone number is received from another mobile telephone having an associated mobile telephone, the service engine determines whether the associated telephone number is a registered WOS number; and if both the associated telephone number and the dialed number are not registered WOS numbers, the Service Engine handles the call by a cellular network via the MSC, instead of the WOS.

6. The Wireless Office Network of claim 5, wherein calling the wired terminal assigned to the called subscriber is established via the PBX, if the dialed telephone number is not a registered WOS number.

7. The Wireless Office Network of claim 5, wherein if the dialed telephone number is received from the PBX, the Service Engine determines whether the dialed number is a registered WOS number and handles the call by the PBX, if the dialed number is not registered WOS numbers.

8. The Wireless Office Network of claim 5, wherein the Service Engine converts the registered WOS number to the corresponding mobile telephone number before calling the mobile telephone having the corresponding mobile telephone number.

\* \* \* \* \*